UNITED STATES PATENT OFFICE.

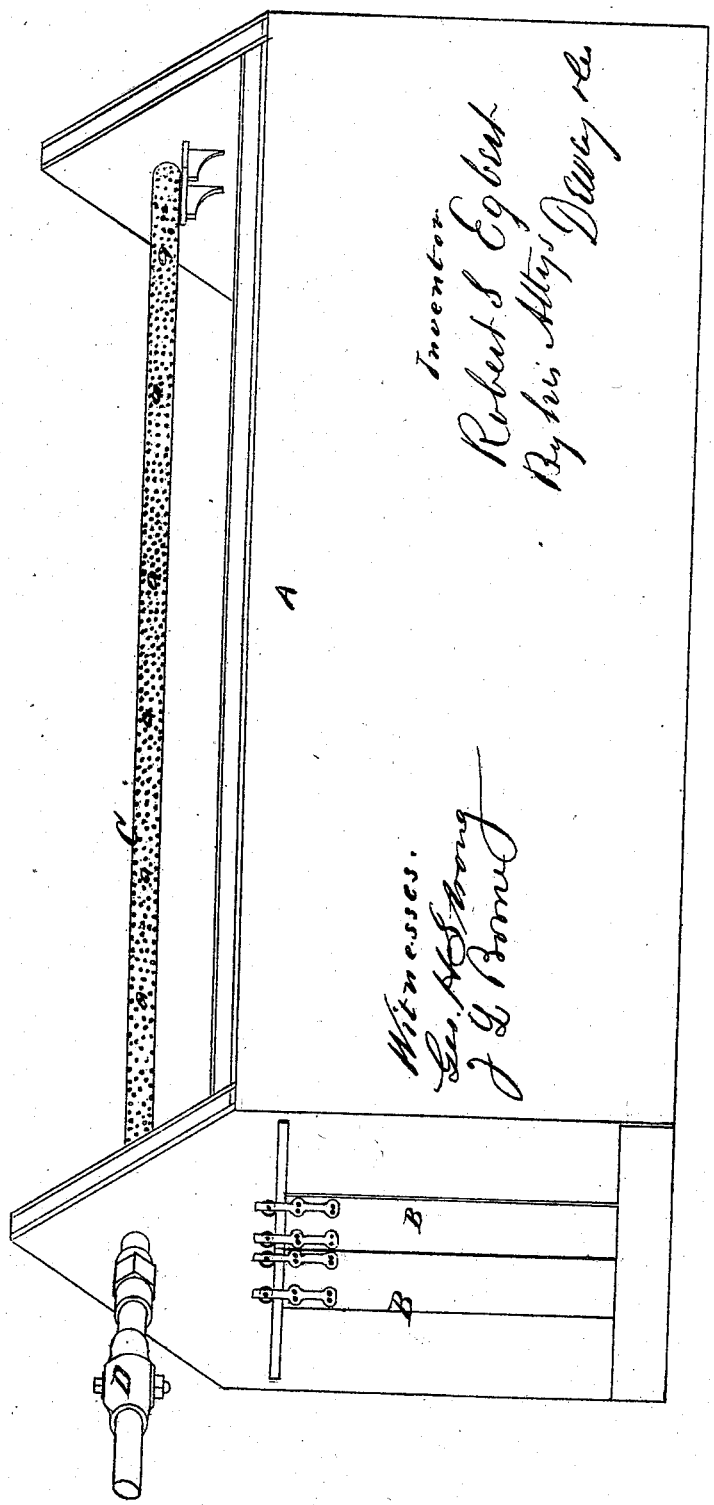

ROBERT S. EGBERT, OF COLFAX, CALIFORNIA.

IMPROVEMENT IN THE MANUFACTURE OF ICE.

Specification forming part of Letters Patent No. 80,063, dated July 21, 1868.

*To all whom it may concern:*

Be it known that I, ROBERT S. EGBERT, of Colfax, county of Placer, State of California, have invented an Improved Method of Forming Ice and Filling Ice-Houses; and I do hereby declare the following description and accompanying drawings are sufficient to enable any person skilled in the art or science to which it most nearly appertains to make and use my said invention or improvements without further invention or experiment.

The nature of my invention is to provide an improved method of filling ice-houses, by forming the ice in the house or inclosure, and thus avoid the necessity of cutting and transporting the ice from the fields or ponds in its crystallized state.

To accomplish this object I employ a house or inclosure constructed with suitable doors and openings for admitting cold air, and extend through it longitudinally a water pipe or pipes pierced with small holes, and the water, passing through this pipe and the perforations, drops in the form of spray or otherwise, and congeals as it falls, the air being intensified in the inclosure or house, especially in the night time, by removing certain portions of the inclosure for admitting a freezing atmosphere from the outside.

To more fully illustrate and describe my invention, reference is had to the accompanying drawings.

A represents a suitable house or inclosure, with sliding doors B B. Openings may be made in the sides of the house and through the roof for admitting outside air, especially at night-time, when the temperature is lower on the outside of the house than it is inside.

A horizontal pipe, C, passes through the house, the opposite end of which is closed, and may rest on a shelf or bracket, and may be supplied with a cock, so that a continuous stream of water may pass through it. This pipe is pierced with small holes *a a a*, and is connected, by a union-coupling, to a pipe leading to a hydrant or reservoir. A stop-cock, D, is placed between the coupling and hydrant or supply-pipe, to regulate the discharge of water through the perforated pipe, so as to allow no more water to pass through the sprinkler into the ice-house than will readily congeal and not freeze up the sprinkler.

The manner of operating may be described as follows, to wit: During freezing weather, or in the night-time, the doors of the ice-house are opened, and water is admitted through the sprinkler C, which, being divided into small jets, drops, or sprays by passing through it, is quickly and easily chilled to near the freezing-point while falling to the floor, where it is at once frozen into a solid mass, similar to the formation of an iceberg by sleet.

The process is further assisted by so placing a few bushes or limbs of trees, on which the falling spray or water will strike before reaching the floor, so that sleet and icicles will form, which can be broken off from time to time and allowed to fall upon the floor, to be increased in size to a solid mass by a constant dripping from the perforated pipe.

Other devices may be employed for the above purpose, such as perforated vessels and the like; but the one described seems to me to be the best, as the object of dividing the water and spreading it out into drops or thin sheets of spray in limited quantities over a large surface, so that it may be quickly chilled, is attained.

By this means ice can be made in seasons and places where the freezing weather is of short duration, or where the nights are cold and the days comparatively warm, as the house can be completely shut up in the day-time and opened at night.

Having thus described my invention, what I claim, and desire to secure by Letters Patent, is—

Forming artificial ice in houses or receptacles by spray, sprinkling or dropping water through a pipe or pipes, C, or vessels pierced with holes *a a a*, or their equivalents, substantially as described.

In witness whereof I have hereunto set my hand and seal.

ROBERT SEELEY EGBERT. [L. S.]

Witnesses:
  LEVI D. LEEDS,
  W. A. HINES.